United States Patent [19]

Brown

[11] 4,453,051

[45] Jun. 5, 1984

[54] TRACK SWITCH HAVING POWER RAILS WITH INTERDIGITATED END MEMBERS

[75] Inventor: Jerry L. Brown, McMurray, Pa.

[73] Assignee: Westinghouse Electric Corp., Pittsburgh, Pa.

[21] Appl. No.: 348,616

[22] Filed: Feb. 12, 1982

[51] Int. Cl.³ .......................... E01B 7/04; E01B 25/12; B60M 1/18

[52] U.S. Cl. .................. 191/22 C; 104/130; 191/29 R; 191/38; 246/419; 403/14; 403/364

[58] Field of Search ............. 104/102, 130; 191/22 C, 191/29 R, 32, 38; 238/14.4, 165, 166, 231, 232, 235, 236, 237; 246/415 R, 419; 403/13, 14, 364

[56] References Cited

U.S. PATENT DOCUMENTS

| | | | |
|---|---|---|---|
| 476,165 | 5/1892 | O'Shea | 238/174 |
| 730,522 | 6/1903 | Donohue | 238/231 |
| 744,212 | 11/1903 | Lanum | 238/235 |
| 892,313 | 6/1908 | Schramm | 238/236 |
| 1,007,257 | 10/1911 | Wadsack | 238/235 |
| 1,292,520 | 1/1919 | Roy | 238/232 |
| 1,392,392 | 10/1921 | Bodie | 246/423 |
| 1,453,024 | 4/1923 | Ryon | 104/102 |
| 3,689,713 | 9/1972 | Shkredka | 191/29 |
| 3,790,725 | 2/1974 | Charamel et al. | 191/29 |
| 3,946,974 | 3/1976 | Stiefel et al. | 104/130 X |
| 4,090,452 | 5/1978 | Segar | 191/32 X |
| 4,168,770 | 9/1979 | Segar et al. | 191/32 X |
| 4,214,535 | 7/1980 | Gerhard | 104/130 X |
| 4,246,986 | 1/1981 | Shuto | 191/29 R |

Primary Examiner—Robert B. Reeves
Assistant Examiner—David F. Hubbuch
Attorney, Agent, or Firm—R. G. Brodahl

[57] ABSTRACT

A moving vehicle power distribution apparatus includes power signal and ground signal rails provided along a roadway track including a track switch. As the track switch is moved to pass the vehicle to selected roadway tracks, the signal and power rails can become misaligned and damage current collectors carried by the vehicle that travel along these rails. Coupling members having interdigitated members extend between the rail sections to control the movement of the current collectors as the vehicle travels through the track switch.

9 Claims, 9 Drawing Figures

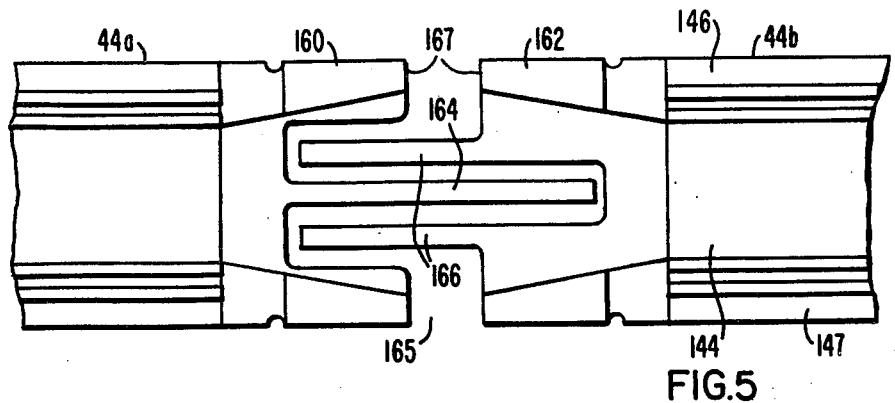

TRACK SWITCH HAVING POWER RAILS WITH INTERDIGITATED END MEMBERS

CROSS REFERENCE TO RELATED APPLICATION

The present application is related to a concurrently filed patent application Ser. No. 348,615 by B. T. Scales et al. and entitled "Current Collection Apparatus For A Transportation System", which is assigned to the same assignee and the disclosure of which is incorporated herein by reference.

BACKGROUND OF THE INVENTION

A rubber-tired vehicle transportation system, as described in an article published in the conference record of the 28th IEEE vehicular technology group in relation to a meeting in Denver in March 1978 and entitled Atlanta Airport People Mover, can include a guide beam located in the center of parallel vehicle support tracks, with a power distribution apparatus consisting of five rail members mounted on top of the guide beam and operative with vehicle carried current collector shoes to provide desired propulsion power and control signals to the vehicle. The three top rails distribute three phase AC power, and fourth and fifth rails provide guidance for the main collector shoes as well as a ground for the vehicle system and are used for the provision of speed command signals to control the vehicle and to detect the presence of the vehicle in each of provided track signal blocks. Such a track system can include a movable track switch that operates between the two parallel support tracks and includes at least one movable guide beam with movable power rails. As the track switch moves back and forth between alternate route selection positions, the ends of the movable power, ground and signal rails carried by that switch have to align with cooperating fixed position power, ground and signal rails. It is difficult to cut a given rail into a fixed section and a movable section and expect the alignment of the power rail section ends to occur precisely as the switch guide beam is cooperatively positioned. When the power rail ends are slightly misaligned, this can create a power rail contact surface discontinuity in one or both of the vertical and horizontal directions such that as the collector shoe moves along the power rail contact surface, one rail end sticks out farther than the other rail end. A moving collector shoe can hit this discontinuity at upwards of 25 or 30 miles per hour such that the shoe will sometimes bounce away from the desired coupling with the contact surface of the misaligned power rail. When a shoe moves away from the power rail and does not go back into the desired coupling position with the contact surface of that power rail, this can result in the loss of power to the vehicle propulsion motor and in the shoe causing a phase-to-phase electrical short with one of the other power rails. Also when the collector shoe hits the sharp edge of a misaligned rail end this can damage the typical powder metallurgy shoe made of carbon and copper, which shoe is quite brittle and repeated banging of the shoe in this manner will cause the shoe to fracture and eventually break.

In U.S. Pat. No. 4,168,770, the disclosure of which is incorporated herein by reference, there is shown a power distribution rail arrangement mounted on top of the center guide beam of a roadway track and operative with collector shoes carried by a vehicle moving along that roadway track.

In U.S. Pat. No. 4,090,452, the disclosure of which is incorporated herein by reference, there is shown an example of the track switch here involved. The movable guide beam sections of the track switch are movable between a first position with one movable guide beam coextensive with a fixed guide beam of a first roadway and a second position with another movable guide beam coextensive with the fixed guide beam of that first roadway. The one movable guide beam leads to a second roadway and the other movable guide beam leads to a third roadway.

As the track switch moves between its first and second positions, a significant misalignment of the power, ground and signal rail ends can occur from time to time. When the track switch moves to a different position another alignment problem occurs and this involves mating several power rail surfaces. There are two power rails on one side and one power rail on the other side of each guide beam section plus control signal and ground rails, so there are several rail ends with mating contact surfaces that have to be aligned. One prior art apparatus included a fiberglass miniature ramp provided at the juncture between power rail sections where the moving guide beam section met with the fixed guide beam section of the roadway to reduce the impact of the vehicle carried moving collector shoe hitting any out of alignment rail surface at that location. Another prior art apparatus to help the power collector shoes bridge the resulting rail gaps or misalignments was a small brass miniature ramp with a curved surface at each rail gap, such that when the vehicle carried power collector shoe moved through such a rail gap that was slightly misaligned the miniature ramp would allow the collector shoe to have greater tolerance for smoothly guiding off and then guiding back on the joined power rail ends. When the moving shoe hit this latter curved surface it was found in practice that such a curved end surface for the power rail end ramp was actually detrimental to the operation of the collector shoe more so than was the previous tapered ramp surface.

SUMMARY OF THE INVENTION

A moving vehicle power distribution apparatus is provided for a transportation system having a roadway track including a central guide beam and a plurality of power rail members operative with respective current collector shoes carried by the vehicle. Each rail member has a gap where a movable track switch section joins a stationary track section and is provided with an interdigitated rail end member having fingers extending beyond the rail member gap with an extended ramp angle to reduce the undesired impact of a moving collector shoe against any misaligned rail section. This provides a more shallow ramp angle for the rail end member to reduce the relative movement between the collector shoe and the contact surface of the rail member as the collector shoe passes over this track switch rail end member gap.

BRIEF DESCRIPTION OF THE DRAWINGS

FIG. 5 shows a view taken in a first direction of the interdigitated rail end members of the present invention;

FIG. 6 shows a view of the interdigitated rail end members of the present invention taken in a second direction perpendicular to the first direction of FIG. 5;

FIG. 7 shows the interdigitated rail end members of FIG. 6 with a positional misalignment of the rail end members;

DESCRIPTION OF THE PREFERRED EMBODIMENT

Figure 1:
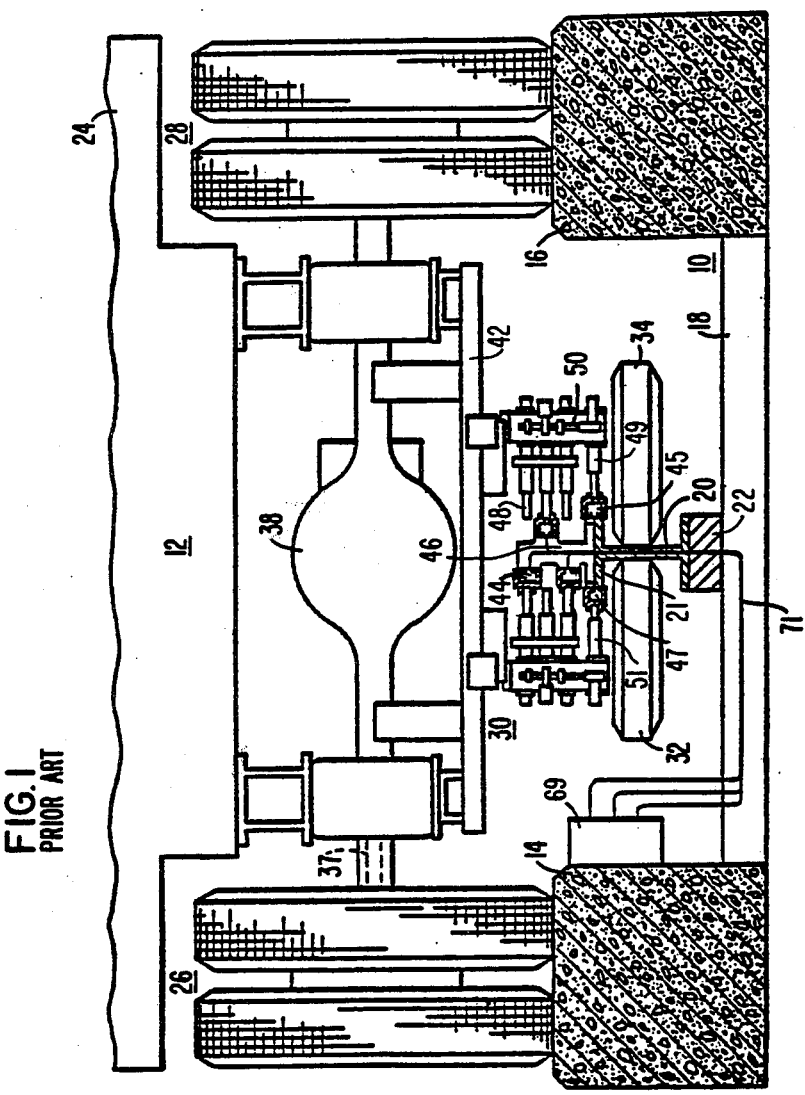
FIG. 1 shows a prior art power distribution apparatus for a rubber-tired transportation vehicle.

In FIG. 1 there is shown a prior art roadway track 10 for a mass transportation vehicle 12 and including support tracks 14 and 16 carried by a road bed 18. A flanged guide beam 20 is positioned between the tracks 14 and 16 and supported by a base member 22 between the road bed 18 and the guide beam 20. The self propelled vehicle 12 includes a body 24 which moves along the roadway tracks 14 and 16 on support wheels 26 and 28 provided at each end of the vehicle 12. The vehicle 12 is self steering through operation of a guidance apparatus 30 including guide wheels 32 and 34 which operate on the opposite sides of the guide beam 20. The guide wheels each rotate about a vertical axle with the upper ends of those vertical axles being fixed to the vehicle steering member 42. The guide beam top flange 21 restrains and prevents the vehicle 12 from leaving the roadway 10. The vehicle 12 is driven by an electric motor operative with the axle 37 within the housing 38, with one such motor being provided for each axle housing. Electric propulsion power is supplied to the vehicle by the energized power rails 44 supported by an insulated member 46 positioned above the top flange 21 of the guide beam 20 and cooperative with power collector shoes 48 supported by the vehicle carried member 50. A suitable power supply 69 is coupled with the power rails 44 through a suitable three phase connection 71 which can pass through a gap, between respective ends of the sections of the guide beam 20, that is small enough for the conductor 71 to pass but not large enough to affect the operation of the guide wheels 32 and 34. A signal rail 45 and a ground rail 47 are provided adjacent to the top flange 21 of the guide beam 20. A collector shoe 49 is operative with the signal rail 45, and a collector shoe 51 is operative with the ground rail 47. A more detailed description of the operational and physical relationship of the provided rails 44, 45 and 47 and the collector shoes 48, 49 and 51 is provided in U.S. Pat. No. 4,168,770, the disclosure of which is incorporated herein by reference.

Figure 2:
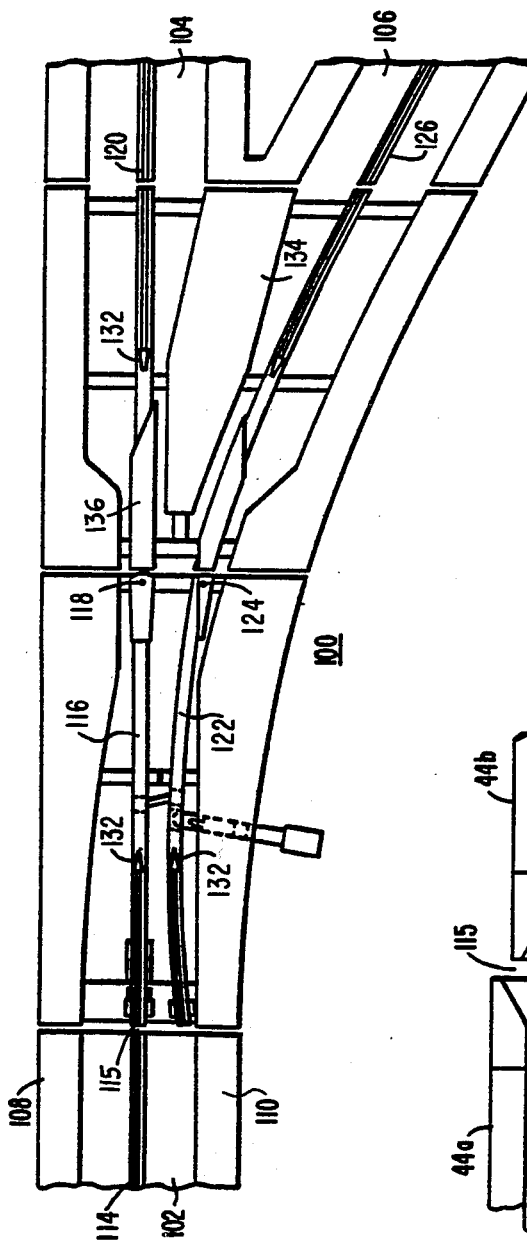
FIG. 2 shows a prior art track switch for a roadway track operative with a rubber-tired vehicle.

In FIG. 2 there is shown a prior art pivotal guide beam track switch 100 that is disclosed in greater detail in U.S. Pat. No. 4,090,452, the disclosure of which is incorporated herein by reference. The pivotal guide beam switch 100 is located at the junction of a first vehicle roadway 102, a second vehicle roadway 104 and a third vehicle roadway 106. The switch 100 and roadways 102, 104 and 106 are comprised of laterally spaced concrete tracks 108 and 110. A flanged guide beam 114 is located between the tracks 108 and 110 of the first roadway 102. The pivotal guide beam switch 100 controls the travel of a transportation vehicle between roadways 102 and 104 and between roadways 102 and 106. The pivotal guide beam switch 100 includes a first movable switching guide beam 116 movable in relation to a pivot 118, and a second switching guide beam 122 movable in relation to a pivot 124. The power rails 44 including the signal rail 45 and the ground rail 47 as shown in FIG. 1 are provided along the top flange of each of the switching guide beam 116 and the switching guide beam 122 as shown in FIG. 2. The signal rail 45 and the ground rail 47 extend the full length of each of the switching guide beams 116 and 122 and the fixed guide beams 120 and 126 that are cooperative respectively with the switching guide beams 116 and 122.

Figure 3:
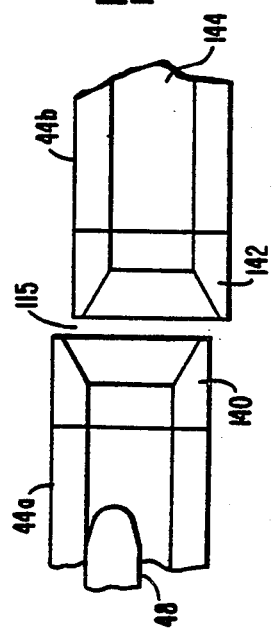
FIG. 3 shows a prior art miniature ramp end member provided for each power rail adjacent to a rail gap and illustrating a first misalignment relationship.

In FIG. 3 there is shown the vertical misalignment of the ramp ends of an illustrative one of the power rails 44. A tapered ramp end member 140 is provided for the power rail 44a shown to the left in FIG. 3 and a similar tapered ramp end member 142 is provided for the power rail 44b shown to the right, with a vertical misalignment of the power rails 44a and 44b being shown for purpose of example. It should be understood that the power rails 44a and 44b are illustrated with the contact surface 144 positioned vertically, such as shown in FIG. 1. In addition, the rail sections 44a and 44b are illustrative of any one of the power rails 44, signal rail 45 or ground rail 47 as shown in FIG. 1, with the gap 115 being provided where the movable end of one of the switching guide beams 116 and 122 of the track switch 100 is adjacent to and cooperative with the end of the guide beam 114 of the roadway 102.

The power rails 44 extend along a partial length of each of the movable guide beams 116 and 122 as shown in FIG. 2. For example, the power rails 44 extend from a guide beam gap 115 provided between the illustrated left end of the movable guide beam 116 and the fixed guide beam 114 of the roadway 102 and then continue to the right toward the pivot connection 118 for a portion of the length of the movable guide beam 116. The guide beam 122 is movable about pivot connection 124 in relation to the fixed position guide beam 114 of the roadway 102 and the fixed position guide beam 126 of roadway 106. Power rails 44 are shown extending along each of the guide beams 114 of roadway 102, the guide beam 126 of roadway 106 and the guide beam 120 of roadway 104.

An insulated ramp apparatus 132 is provided at the illustrated right end of each of the power rails 44 positioned above the guide beam 116 and the guide beam 122 and the left end of the power rails 44 above guide beam 120 to enable the vehicle collector shoes carried by a traveling vehicle to engage and disengage these power rails 44 when the vehicle travels through the track switch 100. The power rails 44 terminate at ramp apparatus 132 to permit the vehicle support wheels to cross the guide beam surfaces 134 and 136 without interference with the power rails when the vehicle is traveling between the roadways 102 and 106 and between roadways 102 and 104 as disclosed in U.S. Pat. No. 4,090,452.

Figure 4:
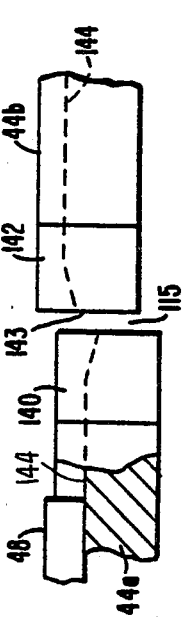
FIG. 4 shows the prior art miniature ramp end member of FIG. 3 with a second misalignment relationship.

In FIG. 4 a second view of the power rails 44a and 44b is provided with the tapered ramp end member 140 being shown misaligned in a direction parallel to the plane of the drawing, in relation to the tapered ramp end member 142. A vehicle carried current collector shoe 48 is shown touching the contact surface 144 of the power rail 44a. If a vehicle is moving in a direction to the right and parallel to the power rails 44a and 44b as shown, the collector shoe 48 carried by that vehicle would travel to the ramp end member 140 of the power rail 44a and then would travel across the gap 115 and possibly collide with the offset ramp end member 142 such that the collector shoe 48 could in this manner become damaged or be moved away from the contact surface 144 of the power rail 44b depending upon the vehicle travel speed and the physical amount of the illustrated misalignment. It should be understood that the rail portion 44a could be positioned along the guide beam 114 of roadway 102 and the rail portion 44b could be positioned along the first movable switching guide beam 116, in relation to the gap 115 between the guide beams 114 and 116, as shown in FIG. 2.

A modification of the prior art ramp end members 140 and 142 of the power rails 44a and 44b shown in FIG. 4 would be to have a tapered first portion and then a curved second portion for each of the ramp end members 140 and 142. In practice the physical gap 115 between the power rail ramp end members 140 and 142 can be up to about one-half inch in distance with a curved ramp end member 142. The traveling current collector shoe 48 can hit at the wrong angle, each time with a not quite but almost perpendicular angle, to cause the shoe 48 to bounce away from the contact surface 144. The gap 115 between the power rail end members 140 and 142 is necessary because each switching beam section 116 and 122 is moving horizontally about pivots 118 and 124 and coming back and forth, so a power rail gap 115 is required to prevent the two power rail end members 140 and 142 from hitting each other. Under cold and hot operating temperature conditions, the rail length can extend and contract such that enough of a gap 115 is provided to allow for the resulting rail length variation. This gap 115 can result in the shoe 48 actually hitting the rail end member 142 where the shoe 48 could chip away and damage the ramp end member 142. When a brass ramp end member 142 was utilized in practice, the shoe 48 actually deformed the brass ramp end member 142 and over a period of time the shoe 48 would repeatedly hit the ramp end member 142 and eventually the shoe 48 would break.

In FIG. 5 there is shown the interdigitated or extended finger rail end member coupling arrangement of the present invention, including power rail end members 160 and 162 which enable decreasing the slope of the cooperative fingers 164 and 166 and extending the effective contact surface angle in both directions to provide a substantially continuous contact surface 144 with a more shallow ramp end angle. This decreased slope ramp angle of the interlocking fingers 164 and 166 prevents the collector shoe from actually hitting an extreme end surface when the collector shoe is moving along the contact surface 144. The collector shoe 48, when moving to the right as shown in FIG. 5, moves down the finger 164 of the ramp end member 160 which the shoe is leaving, then the shoe is picked up by the fingers 166 of the rail ramp end member 162 that the shoe is entering, such that the shoe 48 is presented with no extreme end surface. The interdigitated ramp end members 160 and 162 permit making the effective ramp angle much more shallow, and that improves the performance of the traveling collector shoe 48 because the collector shoe movement passing along the contact surface 144 does not dip as much as it passes through a gap 165 between the rails 44a and 44b.

The prior art ramp end members 140 and 142 shown in FIG. 4 had a greater ramp angle in relation to guidance of the collector shoe along the contact surface 144 and the likelihood of a more abrupt end surface 143 being presented at the gap 115. The misalignment was the determining factor of the ramp angle, and provision had to be allowed for that misalignment such that the prior art ramp angle had to be greater such as 15° and more steep so the shoe could possibly hit against the ramp end surface 143 depending upon the magnitude of the misalignment, as shown in FIG. 4.

The interdigitated rail ramp end members 160 and 162 shown in FIG. 5 provided a significant improvement in the operation of the rail end member and collector shoe operational coupling arrangement and allows for a larger rail end position misalignment with a more forgiving operation of the rails 44a and 44b in relation to the travel of the power collector shoe 48. Some vertical misalignment is permitted between the interdigitated fingers 164 and 166 because they allow for some vertical movement of the rail end members 160 and 162 in the plane of the FIG. 5 drawing as the switch beam moves horizontally perpendicular to that plane and comes back into a desired position. The interdigitated fingers 164 and 166 have a more shallow ramp angle in the order of 5° to extend each finger past the primary end surfaces 167 of the respective end members 160 and 162, which reduces the likelihood of the traveling shoe 48 hitting on the end surface 167 of one rail end member when the shoe is traveling through an interdigitated joint of the rail end members 160 and 162. The ramp end member fingers 166 on the end member 162 can be provided on the track switch guide beams 116 and 122, the movable ends of which each move about a total horizontal switching distance in the order of a foot and a half.

One of the problems with the prior art rail ramp end members 140 and 142 of FIG. 4 is that a shoe bounce is not only damaging to the shoe 48 and eventually can break the shoe but if the shoe bounces out of the power rail completely and does not move back into the same power rail this can cause electrical power supply phase shorting problems and the like to shut the vehicle transportation system down completely.

The track switch guide beams 116 and 122 have respective pivot points 118 and 124 to the right as shown in FIG. 2. The left ends of these guide beams 116 and 122 move about one and one half feet as would the rail end members 162 such as shown in FIG. 5, which might be carried by these track switch guide beams in relation to the fixed guide beam 114 which might carry the rail 44a. The collector shoe 48 is nearly the full vertical width of the rail contact surface 144 and slides along the contact surface 144 with only about 1/16th of an inch clearance in relation to the side sections 146 and 147 of the rail shown in FIG. 5 and which extend away from and perpendicular to the plane of the FIG. 5 drawing. Some horizontal rail end misalignment in actual practice and as shown in FIG. 7 has been measured up to $\frac{3}{8}$ inch but most of the time the average misalignment is probably in the $\frac{1}{8}$ inch range.

The prior art rail ramp end members 140 and 142 as shown in FIG. 4 had a ramp angle of about 15° compared to the fingers 164 and 166 of the interdigitated ramp ends 160 and 162 shown in FIG. 5 and FIG. 6 that have a ramp angle of about 5°. In practice the vertical misalignments practically realized are considerably less of a problem than the horizontal misalignments, since each movable guide beams 116 and 122 of the track switch 100 is moving in a horizontal direction. To precisely position and align the movable guide beam horizontally is more difficult than it is to maintain the vertical alignment of that guide beam since the primary travel is in the horizontal direction. In addition the movable beam section is vertically carried on a support roller so once the vertical alignment is established by the proper adjustment of the support roller position, the rail end members will repeatedly become vertically positioned with little vertical misalignment that is less than or in the order of 1/16 of an inch maximum.

The horizontal direction alignment of the track switch 100 weighing a couple of thousand pounds is more difficult since the guide beam sections 116 and 122 are each heavy steel beams. A locking pin is hydraulically driven into a locking socket for the guide beam operative with the vehicle to position the movable guide beam section that is cooperative with the fixed guide beam section 114, and to prevent movement of that movable guide beam when a vehicle passes through the track switch 100. Even though the switch is actually locked into place, if it is initially or becomes misaligned it will be misaligned on every position change of the track switch 100 and in practice it is very difficult to keep the rails carried by the track switch guide beams 116 and 122 precisely aligned as desired. After continued usage the guide beam horizontal alignment change is significant enough that the interdigitated rail end ramp fingers 164 and 166 are required to allow for this horizontal misalignment and to reduce the otherwise undesired wear and destruction of the power collector shoes.

In FIG. 6 there is shown a top view of the rail end coupling apparatus shown in FIG. 5, with no horizontal misalignment of the rail end members 160 and 162.

In FIG. 7 there is shown a top view of the rail end coupling apparatus shown in FIG. 5, with some horizontal misalignment of the rail end members 160 and 162, and showing the ramp surface 163 of the finger 164 intersecting the ramp surface 165 of the finger 166 such that the collector shoe 48 cannot have a damaging impact hit with the end surface 161 of the finger 166 when traveling to the right as shown in FIG. 7.

Figure 8:
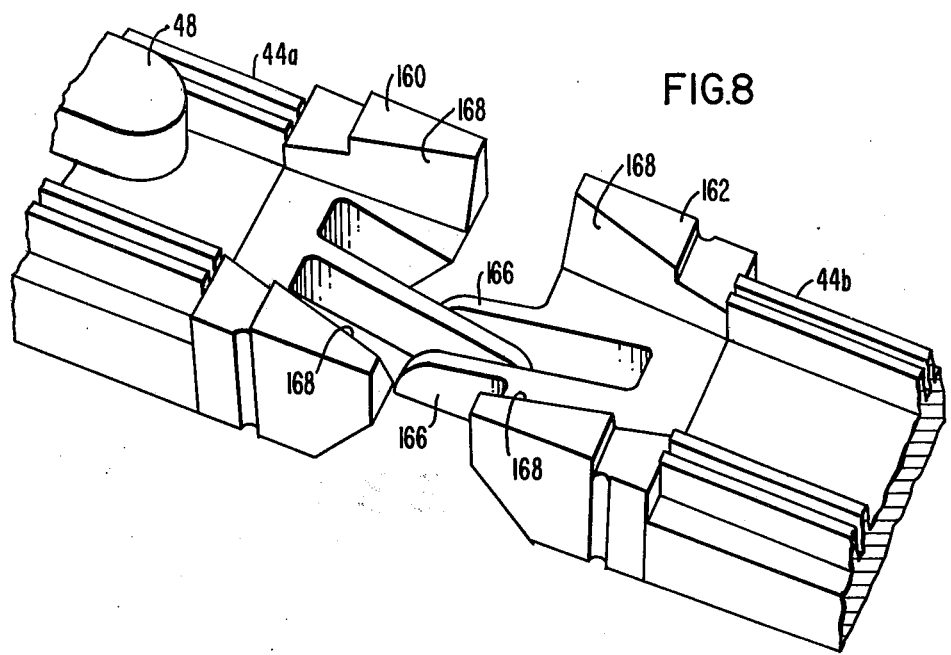
FIG. 8 shows a perspective view of the interdigitated rail end members of the present invention.

FIG. 8 shows a perspective view of the rail end coupling apparatus shown in FIG. 5 with no misalignment of the power rail end members 160 and 162. Note that each of the end members 160 and 162 includes vertical movement control ramp surfaces 168 at the top and bottom portions of each of the end members 160 and 162.

The prior art ramp end members 140 and 142 cannot practically be provided with a smaller ramp surface angle since this would increase the height of the end surface 143 and increase the undesired problem of the collector shoe 48 hitting the end surface 143 with a likelihood of damage to the shoe 48 for a given misalignment of the rails 44a and 44b. In comparison, the end members 160 and 162 shown in FIGS. 5, 6 and 7 operate satisfactorily with a smaller ramp surface angle, which reduces the high force impact of the collector shoe 48 coming into contact with the out-of-alignment rail 44b when the shoe 48 is traveling from the other rail 44a. For the same amount of rail misalignment, the end members 160 and 162 provide a smoother and reduced force impact collector shoe movement transition from one rail to the other rail, when passing across the gap 165 between the rails 44a and 44b.

Figure 9:
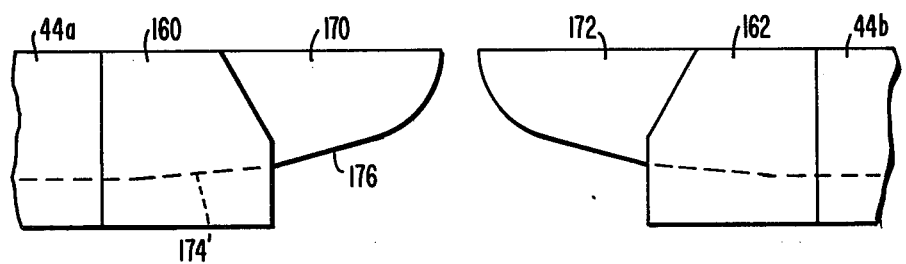
FIG. 9 shows a modification of the interdigitated rail end members of the present invention.

A modification of the end members 160 and 162 is shown in FIG. 9. The rail sections 44a and 44b are separated for purpose of illustration, such that the extended fingers 170 and 172 are not adjacent and overlapping as they would be in the actual operation with a collector shoe traveling from one rail section to the other rail section. Each finger, for example finger 170, has a lower slope surface 174 and a higher slope surface 176. The lower slope surface 174 can have a ramp of about 5° and the higher slope surface 176 can have a ramp of about 15°, such that a larger misalignment of the rail sections 44a and 44b is permitted for satisfactory operation in relation to a given length of the fingers 170 and 172. If the fingers 170 and 172 are increased in length, this enables a larger gap between the end members 160 and 162 in actual operation and a correspondingly larger misalignment of the rail sections 44a and 44b, while still providing a desired collector shoe controlling overlap of the surfaces 174 or 176 of the respective fingers 170 and 172.

I claim:

1. In current collection apparatus for a vehicle having at least one collector shoe and operative to travel along a track including a track switch, with said track switch determining the passage of the vehicle between a first track section and a selected one of second and third track sections, the combination of
   first power rail means cooperative with the collector shoe and positioned along the first track section,
   second power rail means cooperative with the collector shoe and positioned along the track switch to provide a predetermined gap from the first power rail means,
   a first end member cooperative with the collector shoe and coupled with the first power rail means, with the first end member having a first contact surface extending into said gap in a first direction toward the track switch,
   a second end member cooperative with the collector shoe and coupled with the second power rail means, with the second end member being movable with the track switch and having a second contact surface extending into said gap in a second direction toward the first power rail means,
   with the first and second contact surfaces having an interdigitated relationship extending beyond said gap such that the position of a collector shoe is controlled through said gap by said first and second surfaces as the collector shoe travels through said gap.

2. The apparatus of claim 1, with each one of the first and second contact surfaces including at least one finger that extends toward the other of those contact surfaces such that the fingers provide said interdigitated relationship in said gap.

3. The apparatus of claim 1, with the track switch having a first switch member and a second switch member that are horizontally movable between a first position where the first switch member is coextensive with the first track section and a second position where the second switch member is coextensive with the first track section, and with the second power rail means being positioned along the first switch member and spaced by said gap when the track switch is in said first position, said apparatus including
   third power rail means positioned along the second switch member and spaced by a second predetermined gap from the first power rail means when the track switch is in said second position; and a third end member cooperative with the collector shoe and coupled with the third power rail means, with the third end member having a third contact surface extending into the second gap toward the first power rail means, with the first and third contact surfaces having an interdigitated relationship extending beyond the second gap such that the position of the collector shoe is controlled through the second gap by the first and third contact surfaces as the collector shoe travels through the second gap.

4. The apparatus of claim 1, with the second end member coupled with the second power rail means being horizontally movable in relation to the first end member coupled with the first power rail means.

5. The apparatus of claim 1, with a plurality of first power rail means positioned along the first track section and a like plurality of second power rail means positioned along the track switch such that each of the second power rail means is spaced from and cooperative with a different one of the first power rail means to provide a gap, and including a first end member having a first contact surface coupled with each one of said first power rail means and extending in a first direction toward the track switch into the gap associated with said one first power rail means, a second end member having a second contact surface coupled with each one of said second power rail means and cooperative with a different one of the first end members, said second contact surface extending in a second direction toward the first power rail means and into the gap associated with said one second power rail means, with each first contact surface and the cooperative second contact surface having an interdigitated relationship such that the position of a collector shoe is controlled through the gap associated with that first contact surface.

6. In power collection apparatus for a vehicle having a collector member and traveling along a track including a movable track switch operative with a first track section, the combination of first power rail means operative with the collector member and positioned parallel to the first track section, second power rail means operative with the collector member and positioned parallel to and movable with the track switch, with the second power rail means being separated a predetermined distance from the first power rail means, said first power rail means including first coupling means cooperative with the collector member and having a first contact surface extending toward the second power rail means, and said second power rail means including second coupling means cooperative with the collector member and having a second contact surface movable with the track switch and extending toward the first power rail means and substantially parallel with the first contact surface, with the first contact surface extending past the second contact surface such that the collector member is controlled by the first and second contact surfaces when the vehicle travels between the track switch and the first power rail section.

7. The power collection apparatus of claim 6, with the first contact surface and the second contact surface providing position control of the collector member when traveling across said distance.

8. The power collection apparatus of claim 6, with each of said first contact surface and the second contact surface having a predetermined length determined by said distance.

9. The power collection apparatus of claim 6, with each of the first and second contact surfaces having a ramp surface slope established to permit a predetermined misalignment between the first and second power rail means resulting from movement of the track switch.

* * * * *